United States Patent
Lee et al.

(10) Patent No.: US 12,466,406 B2
(45) Date of Patent: Nov. 11, 2025

(54) METHOD FOR CONTROLLING VEHICLES, ELECTRONIC DEVICE, AND STORAGE MEDIUM

(71) Applicant: HON HAI PRECISION INDUSTRY CO., LTD., New Taipei (TW)

(72) Inventors: Chieh Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 371 days.

(21) Appl. No.: 18/125,679

(22) Filed: Mar. 23, 2023

(65) Prior Publication Data

US 2024/0199017 A1 Jun. 20, 2024

(30) Foreign Application Priority Data

Dec. 16, 2022 (CN) .......................... 202211622514.1

(51) Int. Cl.
*B60W 30/16* (2020.01)
*G08G 1/017* (2006.01)

(52) U.S. Cl.
CPC ............. *B60W 30/16* (2013.01); *G08G 1/017* (2013.01); *B60W 2420/408* (2024.01); *B60W 2520/06* (2013.01); *B60W 2554/404* (2020.02); *B60W 2554/80* (2020.02)

(58) Field of Classification Search
CPC ........... B60W 30/16; B60W 2420/408; B60W 2520/06; B60W 2554/404; B60W 2554/80; B60W 2420/403; B60W 2556/45; G08G 1/017; G06V 20/58; G06V 20/625; G06V 2201/08; G06N 3/04; G06N 3/08
See application file for complete search history.

(56) References Cited

U.S. PATENT DOCUMENTS

| | | | | |
|---|---|---|---|---|
| 5,515,042 A | * | 5/1996 | Nelson | G08G 1/054 340/936 |
| 6,351,208 B1 | * | 2/2002 | Kaszczak | B60R 99/00 362/540 |
| 2012/0262579 A1 | * | 10/2012 | Chen | G08G 1/04 348/148 |
| 2013/0035857 A1 | * | 2/2013 | Lee | G01C 21/3841 701/533 |
| 2020/0294401 A1 | * | 9/2020 | Kerecsen | G08G 1/205 |
| 2022/0340131 A1 | * | 10/2022 | Ito | B60W 30/162 |
| 2024/0375618 A1 | * | 11/2024 | Nichols | G07C 5/008 |
| 2025/0080825 A1 | * | 3/2025 | Narumi | G08G 1/052 |
| 2025/0148797 A1 | * | 5/2025 | Nakayama | G06V 20/56 |

* cited by examiner

Primary Examiner — Mussa A Shaawat
(74) Attorney, Agent, or Firm — ScienBiziP, P.C.

(57) ABSTRACT

A method for controlling vehicles, an electronic device and a storage medium are provided. In the method, a license plate image of a target vehicle in front of a vehicle to be controlled and point cloud data of the target vehicle through a radar are acquired. The license plate image is identified to obtain initial vehicle data of the target vehicle. Target vehicle data of the target vehicle is calculated based on preset ranges, vehicle data of the vehicle to be controlled, the point cloud data and the initial vehicle data. In response that the target vehicle data meets preset conditions, the vehicle data of the vehicle to be controlled is adjusted according to the target vehicle data. The method can improve an accuracy of vehicle detection and a driving safety.

12 Claims, 3 Drawing Sheets

METHOD FOR CONTROLLING VEHICLES, ELECTRONIC DEVICE, AND STORAGE MEDIUM

FIELD

The present disclosure relates to a technical field of vehicle control, specifically a method for controlling vehicles, an electronic device and a storage medium.

BACKGROUND

In the scheme of image based detection of vehicle surroundings and driving conditions, point cloud data can be acquired by radar for subsequent image recognition. However, as the point cloud data obtained by radar is a very sparse signal, and the radar cannot detect vehicles which are static, moving slowly or too close to the host vehicle. A detection accuracy of vehicles under the above conditions may be poor, thus affecting driving safety.

DETAILED DESCRIPTION

The accompanying drawings combined with the detailed description illustrate the embodiments of the present disclosure hereinafter. It is noted that embodiments of the present disclosure and mapped features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Figure 1:
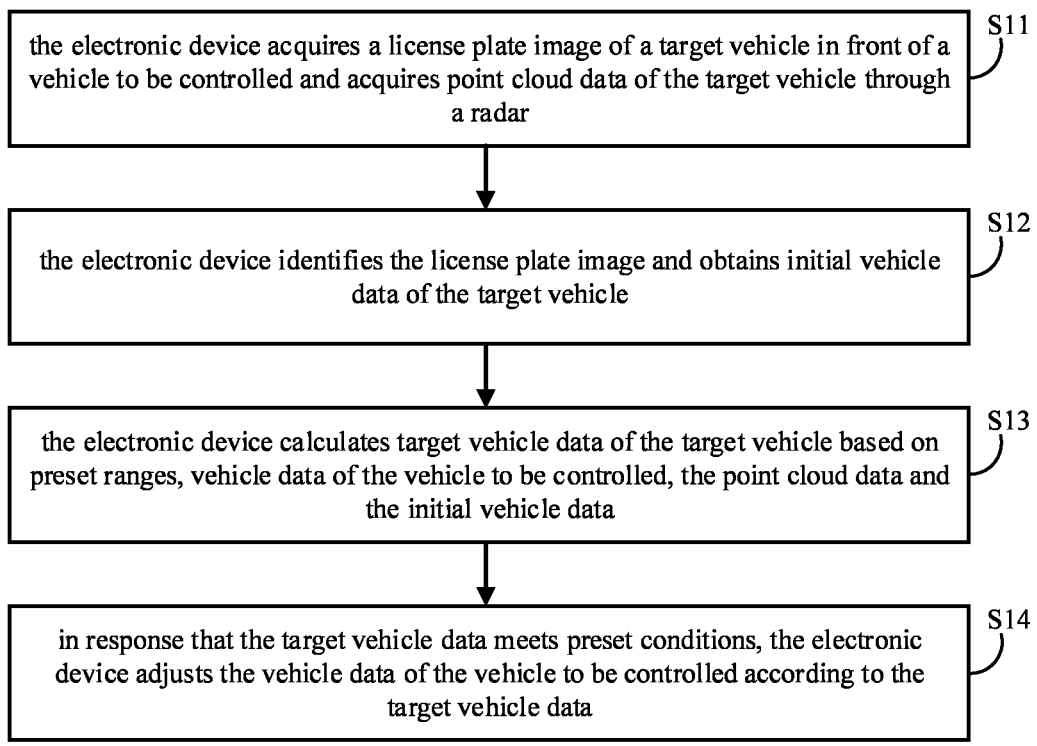
FIG. 1 shows a flowchart of a method for controlling vehicles provided in an embodiment of the present disclosure.

FIG. 1 is a flowchart of a method for controlling vehicles in an embodiment of the present disclosure. The method for controlling vehicles is applied to an electronic device. According to different needs, the order of the steps in the flowchart can be changed, and some can be omitted.

In block S11, the electronic device acquires a license plate image of a target vehicle in front of a vehicle to be controlled and acquires point cloud data of the target vehicle through a radar.

In an embodiment of the present disclosure, the license plate image refers to an image of a license plate of the target vehicle. The license plate can be a front license plate at a front of the target vehicle and a rear license plate at a rear of the target vehicle. The target vehicle is a vehicle traveling in front of the vehicle to be controlled. The vehicle to be controlled is a vehicle that needs to be controlled.

In an embodiment of the present disclosure, the electronic device controls a photographing device to capture a vehicle image of the target vehicle. Then the electronic device detects a license plate of the vehicle image, and determines a position of the license plate in the vehicle image. The electronic device cuts the vehicle image according to the position of the license plate to obtain the license plate image. The license plate of the vehicle image can be detected through target detection algorithms. The target detection algorithms include, but are not limited to, a region convolutional neural networks (R-CNN) algorithm and a Fast R-CNN algorithm.

The photographing device communicates with the electronic device, and the photographing device can be a car camera or other devices with photographing function (for example, a tachograph, etc.).

Since a size of a license plate of each vehicle type is accurate and uniform, and types of license plates are less and simpler than types of vehicles, using the license plate image instead of the vehicle image can more accurately calculate a first relative distance between the target vehicle and the vehicle to be controlled.

In an embodiment of the present disclosure, the point cloud data is data obtained by the radar. The radar can be a built-in radar of the vehicle to be controlled, and the radar includes, but is not limited to a millimeter wave radar, a laser radar, a ultrasonic wave radar, etc.

An accuracy of the point cloud data can be ensured to a certain extent because the radar scanning of the target vehicle is not affected by factors such as light and weather.

In block S12, the electronic device identifies the license plate image and obtains initial vehicle data of the target vehicle.

The initial vehicle data is data of the target vehicle obtained by identifying the license plate image. The initial vehicle data includes, but is not limited to a first relative distance between the target vehicle and the vehicle to be controlled, a speed of the target vehicle, and an acceleration of the target vehicle. The first relative distance refers to a longitudinal distance between the target vehicle and the vehicle to be controlled.

Figure 2:
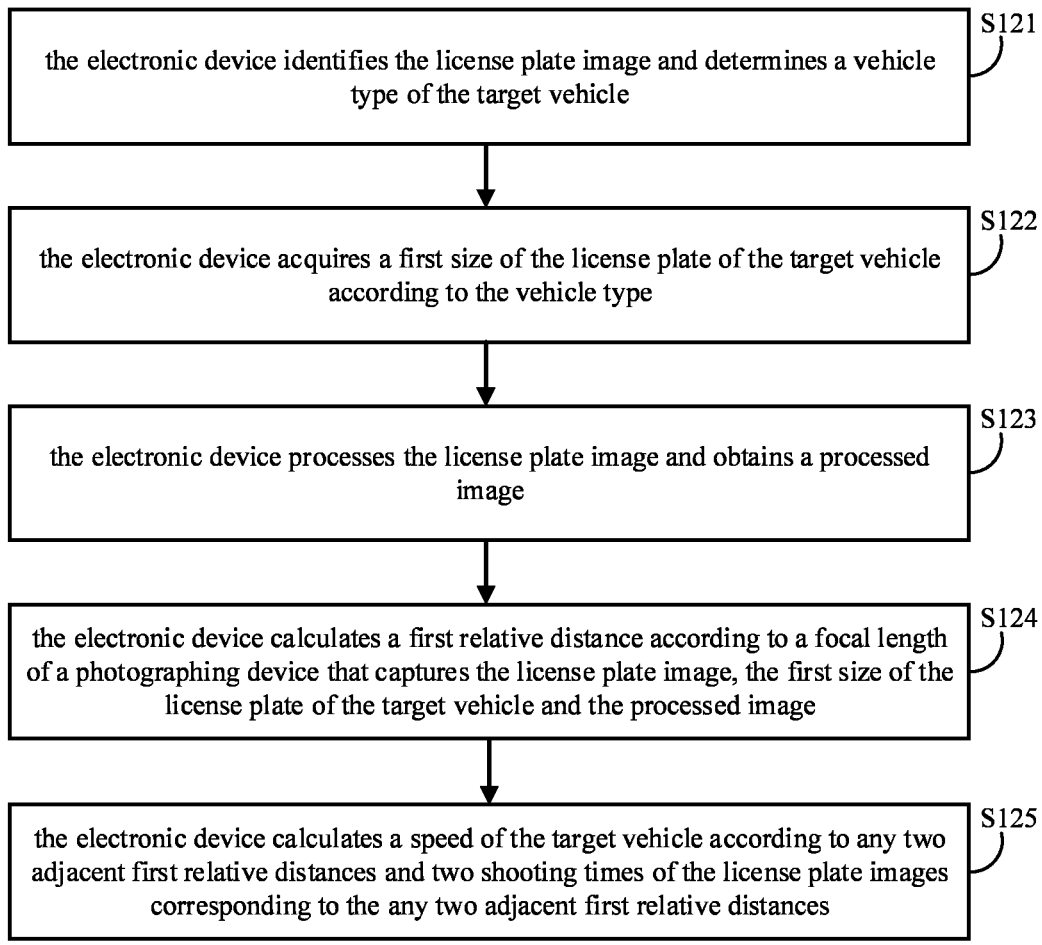
FIG. 2 shows a flowchart of a method for identifying license plate image provided in an embodiment of the present disclosure.

A detailed process of identifying the license plate image can refer to FIG. 2.

In block S13, the electronic device calculates target vehicle data of the target vehicle based on preset ranges, vehicle data of the vehicle to be controlled, the point cloud data and the initial vehicle data.

In at least one embodiment, the target vehicle data refers to vehicle data generated after synthesizing the point cloud data and the initial vehicle data.

Figure 3:
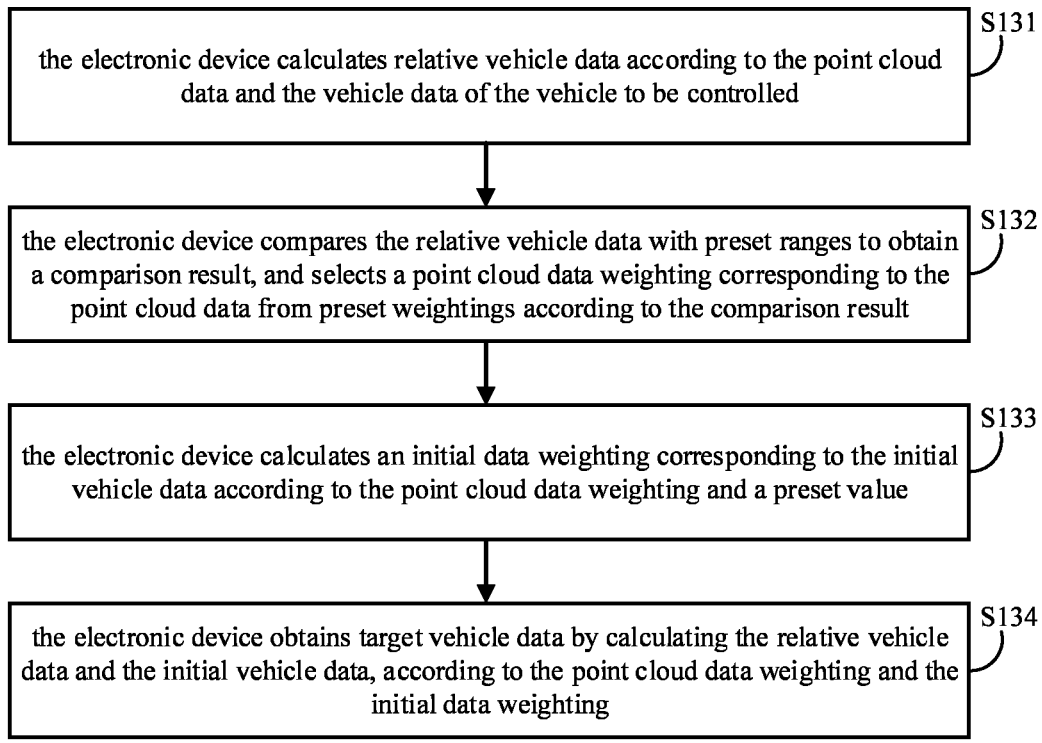
FIG. 3 shows a flowchart of a method for calculating target vehicle data provided in an embodiment of the present disclosure.

A detailed calculation process of the target vehicle data can refer to a process shown in FIG. 3.

In block S14, in response that the target vehicle data meets preset conditions, the electronic device adjusts the vehicle data of the vehicle to be controlled according to the target vehicle data.

The target vehicle data includes a target distance and a target speed.

In at least one embodiment, in response that the target vehicle data meets preset conditions, the electronic device adjusts the vehicle data of the vehicle to be controlled according to the target vehicle data, including:

The electronic device compares the target distance with a preset safe distance, and compares the target speed with a speed of the vehicle to be controlled. In response that the target distance is less than the preset safe distance and/or the target speed is less than the speed of the vehicle to be controlled, the electronic device adjusts the speed of the vehicle to be controlled and an acceleration of the vehicle to be controlled until the target distance is greater than or equal to the preset safe distance.

The electronic device provides a display screen, and displays a prompt on the display screen to prompt a user to adjust the speed of the vehicle to be controlled and the acceleration of the vehicle to be controlled. The prompt can be set according to actual needs, which is not limited here.

In another embodiment, when the vehicle to be controlled is installed with an advanced driver assistance system (ADAS), the electronic device can directly adjust the speed of the vehicle to be controlled and the acceleration of the vehicle to be controlled according to the advanced driver assistance system and preset control strategies.

In other embodiments, the electronic device can be an on-board device, which can transmit vehicle control commands to corresponding devices in the vehicle to be controlled through a processor, such as a deceleration device, so that the vehicle to be controlled can be directly controlled to adjust the speed of the vehicle to be controlled and the acceleration of the vehicle to be controlled, until the target distance is greater than or equal to the preset safe distance.

If the target distance is greater than the preset safe distance and the target speed is greater than the speed of the vehicle to be controlled, the electronic device executes a preset first control strategy. If the target distance is less than the preset safe distance and the target speed is greater than the speed of the vehicle to be controlled, the electronic device executes a preset second control strategy. If the target distance is greater than the preset safety distance and the target speed is less than the speed of the vehicle to be controlled, the electronic device executes a preset third control strategy.

The preset first control strategy, the preset second control strategy, and the preset third control strategy are all strategies for adjusting the vehicle data of the vehicle to be controlled. The preset first control strategy, the preset second control strategy, and the preset third control strategy can be set according to actual needs, which are not limited here.

FIG. 2 is a flowchart of a method for identifying license plate image provided in an embodiment of the present disclosure. The method for identifying license plate image is applied to the electronic device. According to different needs, the order of the steps in the flowchart can be changed, and some can be omitted.

In block S121, the electronic device identifies the license plate image and determines a vehicle type of the target vehicle.

In an embodiment of the present disclosure, the electronic device can identify the vehicle type through a vehicle identification model.

The vehicle identification model is a model obtained by training a deep neural network. The deep neural network can include, but is not limited to, a Resnet50 network, a Lenet5 network, an Alexnet network, a VGG network, etc. The vehicle type include, but are not limited to: a large car, a small car, a coach car, an ordinary motorcycle, a mopeds large new energy vehicle, or a small new energy vehicle.

Since the vehicle identification model is obtained by training the depth neural network using different types of vehicle images, the vehicle identification model can accurately identify different vehicle types. The vehicle identification model can improve an accuracy of vehicle type identification.

In other embodiment of the present disclosure, the electronic device can identify the vehicle type through a license plate recognition model. The license plate recognition model is obtained by training a preset license plate recognition network with a plurality of labeled license plate training images. The label refers to the vehicle type corresponding to each license plate training image, and the plurality of labeled license plate training images are images containing different types of license plates. The license plate recognition network includes, but is not limited to, a Resnet50 network, a Lenet5 network, an Alexnet network, a VGG network, etc. . . . .

By using the plurality of license plate training images to train the license plate recognition network, the license plate recognition model can learn a relationship between each license plate training image and the corresponding vehicle type. Therefore, the vehicle type can be quickly identified through the license plate recognition model.

In block S122, the electronic device acquires a first size of the license plate of the target vehicle according to the vehicle type.

In an embodiment of the present disclosure, different types of vehicles have different sizes of license plates. A size of a license plate can be a width of the license plate, a height of the license plate, or a width*height of the license plate. In order to obtain the size of the license plate according to the vehicle type, a memory of the electronic device (for example, the memory 12 shown in FIG. 4) can store correspondence between vehicle types and the sizes of the license plates in advance. Since the present disclosure usually detects vehicles in the following state, the size of the license plate is usually the size of the rear license plate of the vehicle. For example, when the target vehicle is a large vehicle, a width of the rear license plate of the large vehicle is 440 and a height of the rear license plate of the large vehicle is 220, the size of the real license plate can be 440, 220 or 440*220. Or, when the target vehicle is a large new energy vehicle, a width of the rear license plate of the large new energy vehicle is 480 and a height of the rear license plate of the large new energy vehicle is 140, the size of the real license plate can be 480, 140 or 480*140.

In block S123, the electronic device processes the license plate image and obtains a processed image.

In the embodiment, the processing of the license plate image by the electronic device includes one or more of the following combinations: a binarization processing, an equalization processing, a filtering and denoising processing, and so on.

The processed image can be made clearer by equalizing and filtering the license plate image.

In block S124, the electronic device calculates a first relative distance according to a focal length of a photographing device that captures the license plate image, the first size of the license plate of the target vehicle and the processed image.

In the embodiment, the electronic device calculates the first relative distance according to a focal length of a photographing device that captures the license plate image, the first size of the license plate of the target vehicle and the processed image, including: the electronic device calculates a second size of the license plate of the processed image, calculates a first product of the focal length and the first size of the license plate of the target vehicle, and determines a ratio of the first product to the second size as the first relative distance.

The second size of the license plate of the processed image is a width of the processed image, a height of the processed image, or a width*height of the processed image. The width of the processed image is a number of pixels included in the width of the processed image. The height of the processed image is a number of pixels included in the height of the processed image.

The first size of the license plate of the target vehicle corresponds to the second size of the license plate of the processed image. When the second size is the width of the license plate of the processed image, the first size is the width of the license plate of the target vehicle. When the second size is the height of the license plate of the processed image, the first size is the height of the license plate of the target vehicle. When the second size is the width*height of the license plate of the processed image, the first size is the width*height of the license plate of the target vehicle.

Since the focal length refers to a distance from an optical center of the lens of the photographing device to a focus of light gathering, the ratio of the second size of the license plate of the processed image to the first size of the license plate of the target vehicle, and the ratio of the focal length to the first relative distance have an equal proportion relationship, and the first relative distance can be quickly calculated through the equal proportion relationship.

In block S125, the electronic device calculates a speed of the target vehicle according to any two adjacent first relative distances and two shooting times of the license plate images corresponding to the any two adjacent first relative distances.

In one embodiment, the electronic device calculates a distance difference between the any two adjacent first relative distances, calculates a time difference between the two shooting times of the license plate images corresponding to the any two adjacent first relative distances, and determines a ratio of the distance difference to the time difference as the first vehicle speed.

In other embodiments, the electronic device can also calculate an acceleration of the target vehicle according to any two adjacent speeds of the target vehicle and a time interval between the any two adjacent speeds of the target vehicle.

Specifically, a calculation formula of the acceleration of the target vehicle is:

$$a = (2(V\_1 - V\_2))/t^\wedge 2;$$

In the above calculation formula, a represents the acceleration of the target vehicle, V_1 represents a previous speed of the any two adjacent speeds of the target vehicle, V_2 represents a last speed of the any two adjacent speeds of the target vehicle, a generation time of the last speed is later than the a generation time of the previous speed, and t represents a time interval between the generation time of the last speed and the generation time of the previous speed.

FIG. 3 is a flowchart of a method for calculating target vehicle data provided in an embodiment of the present disclosure. The method for calculating target vehicle data is applied to the electronic device. According to different needs, the order of the steps in the flowchart can be changed, and some can be omitted.

In block S131, the electronic device calculates relative vehicle data according to the point cloud data and the vehicle data of the vehicle to be controlled.

In one embodiment, the relative vehicle data includes a speed of the vehicle to be controlled and a second relative distance.

The electronic device calculates relative vehicle data according to the point cloud data and the vehicle data of the vehicle to be controlled, including:

The electronic device acquires a first position of the target vehicle from the point cloud data; acquires a second position of the vehicle to be controlled from the vehicle data of the vehicle to be controlled; calculates the second relative distance according to the first position and the second position; calculates the speed of the vehicle to be controlled according to any two adjacent second relative distances and two radar scanning times corresponding to the any two adjacent second relative distances.

The second relative distance is a longitudinal distance between the target vehicle and the vehicle to be controlled. The second relative distance can be quickly calculated by a distance formula between two points. A calculation method of the speed of the vehicle to be controlled is basically the same as that of the speed of the target vehicle, so it will not be repeated here.

In block S132, the electronic device compares the relative vehicle data with preset ranges to obtain a comparison result, and selects a point cloud data weighting corresponding to the point cloud data from preset weightings according to the comparison result.

In one embodiment, the preset ranges includes a preset distance range and a preset speed range.

The electronic device selects a point cloud data weighting corresponding to the point cloud data from preset weightings according to the comparison result, including:

In response that the comparison result indicates that the second relative distance is within the preset distance range and the speed of the vehicle to be controlled is within the preset speed range, the electronic device determines that the point cloud data weighting is a preset first weighting. In response that the comparison result indicates that the second relative distance is within the preset distance range and the speed of the vehicle to be controlled is not within the preset speed range, the electronic device determines that the point cloud data weighting is a preset second weighting. In response that the comparison result indicates that the second relative distance is not within the preset distance range and the speed of the vehicle to be controlled is within the preset speed range, the electronic device determines that the point cloud data weighting is a preset third weighting. In response that the comparison result indicates that the second relative distance is not within the preset distance range and the speed of the vehicle to be controlled is not within the preset speed range, the electronic device determines the point cloud data weighting is a preset fourth weighting.

In one embodiment, the preset distance range is a range of distances of the target vehicle accurately detected by the radar. The preset speed range is a range of speeds of the target vehicle accurately detected by the radar. The preset distance range and the preset speed range can be set independently, which is not limited here. For example, the preset distance range can be more than 3 meters, or the preset distance range can be 3 meters to 20 meters. The preset speed range can be more than 30 km/h.

The preset first weighting, the preset second weighting, the preset third weighting, and the preset fourth weighting can be set according to actual needs, which are not limited here. If the second relative distance is within the preset distance range and the speed of the vehicle to be controlled is within the preset speed range, it indicates that an accuracy of the point cloud data is high. Therefore, the preset first weighting can be set to a larger value. For example, the preset first weighting can be 1 or 0.9. If the second relative distance is not within the preset distance range and the speed of the vehicle to be controlled is not within the preset speed range, it indicates that an accuracy of the point cloud data is low. Therefore, the preset fourth weighting can be set to a smaller value. For example, the preset fourth weighting may be 0.1 or 0.

In some embodiments, the preset second weighting and the preset third weighting should be smaller than the preset first weighting and larger than the preset fourth weighting. The preset second weighting and the preset third weighting can be set according to a priority of the second relative distance and the speed of the vehicle to be controlled. When a priority of the second relative distance is greater than a priority of the speed of the vehicle to be controlled, the preset second weighting is greater than the preset third weighting. For example, the preset second weighting is 0.5, and the preset third weighting is 0.4. When a priority of the second relative distance is less than a priority of the speed of the vehicle to be controlled, the preset second weighting is less than the preset third weighting. For example, the preset second weighting is 0.4, and the preset third weighting is 0.6. The priority can be set according to actual needs, which is not limited.

In the above embodiment, in view of whether the second relative distance is within the distance range and whether the speed of the vehicle to be controlled is within the preset speed range, the accuracy of the point cloud data is different. Giving the weighting corresponding to the point cloud data according to the accuracy of the point cloud data can improve a rationality of the point cloud data.

In block S133, the electronic device calculates an initial data weighting corresponding to the initial vehicle data according to the point cloud data weighting and a preset value.

In one embodiment, the electronic device determines a difference between the preset value and the point cloud data weighting as the initial data weighting. The preset value is 1.

In one embodiment, since the initial data weighting is the difference between the preset value and the point cloud data weighting, when the point cloud data weighting is high, an accuracy of the point cloud data is high, an accuracy of the initial data weighting is low, and an accuracy of the initial vehicle data is low. When calculating the target vehicle data below, the point cloud data shall be used as main data for calculation. When the point cloud data weighting is low, the accuracy of the point cloud data is low, the accuracy of the initial data weighting is high, and the accuracy of the initial vehicle data is high. When calculating the target vehicle data below, the initial vehicle data shall be used as main data for calculation.

In block S134, the electronic device obtains target vehicle data by calculating the relative vehicle data and the initial vehicle data, according to the point cloud data weighting and the initial data weighting.

In some embodiments, the electronic device obtains the target vehicle data by calculating the relative vehicle data and the initial vehicle data, according to the point cloud data weighting and the initial data weighting, including:

The electronic device obtains a plurality of second products by calculating a product of the point cloud data weighting and each data in the relative vehicle data, and obtains a plurality of third products by calculating a product of the initial data weighting and each data in the initial vehicle data, and then the electronic device calculates a sum of each second product and the corresponding third product to obtain the target vehicle data.

In the above embodiment, since the point cloud data and the initial vehicle data are integrated, the target vehicle data can be made more accurate, so that driving safety can be improved.

In another embodiment, the point cloud data weighting, the initial data weighting, the point cloud data and the initial vehicle data can be fused through an information fusion algorithm to obtain the target vehicle data.

The present disclosure obtains the license plate image of the target vehicle and identifies the vehicle type of the license plate image. Since each type of vehicle has a uniform and exact size of the license plate, the vehicle data can be calculated through the uniform and exact size of the license plate, which improves the accuracy of the vehicle data. The preset range can measure the accuracy of the point cloud data, and give the point cloud data weighting corresponding to the point cloud data according to the accuracy of the point cloud data, and calculate the external data weighting corresponding to the vehicle data according to the point cloud data weighting and the external data weighting, Therefore, the target vehicle data can be made more accurate, thereby improving driving safety. In addition, since the vehicle data can be the data of a vehicle that is in a static, slow driving state or is too close to it, adding the vehicle data to the calculation of the target vehicle data can solve the technical problem that the radar cannot detect a vehicle that is in a static, slow driving state or is too close to it, resulting in poor detection accuracy of the vehicle.

The embodiment also provides a non-transitory readable storage medium having computer-readable instructions stored therein. The computer-readable instructions are executed by a processor to implement the steps in the above-mentioned method for controlling vehicles, such as in steps in blocks S11-S14 shown in FIG. 1:

In block S11, the electronic device acquires a license plate image of a target vehicle in front of a vehicle to be controlled and acquires point cloud data of the target vehicle through a radar;

In block S12, the electronic device identifies the license plate image to obtain initial vehicle data of the target vehicle;

In block S13, the electronic device calculates target vehicle data of the target vehicle based on preset ranges, vehicle data of the vehicle to be controlled, the point cloud data and the initial vehicle data;

In block S14, in response that the target vehicle data meets preset conditions, the electronic device adjusts the vehicle data of the vehicle to be controlled according to the target vehicle data.

The embodiment also provides a non-transitory readable storage medium having computer-readable instructions stored therein. The computer-readable instructions are executed by a processor to implement the steps in the above-mentioned method for identifying license plate image, such as in steps in blocks S121-S66 shown in FIG. 2:

In block S121, the electronic device identifies the license plate image and determines a vehicle type of the target vehicle;

In block S122, the electronic device acquires a first size of the license plate of the target vehicle according to the vehicle type;

In block S123, the electronic device processes the license plate image and obtains a processed image;

In block S124, the electronic device calculates a first relative distance according to a focal length of a photographing device that captures the license plate image, the first size of the license plate of the target vehicle and the processed image;

In block S125, the electronic device calculates a speed of the target vehicle according to any two adjacent first relative distances and two shooting times of the license plate images corresponding to the any two adjacent first relative distances.

The embodiment also provides a non-transitory readable storage medium having computer-readable instructions stored therein. The computer-readable instructions are executed by a processor to implement the steps in the above-mentioned method for calculating target vehicle data, such as in steps in blocks S61-S66 shown in FIG. 3:

In block S131, the electronic device calculates relative vehicle data according to the point cloud data and the vehicle data of the vehicle to be controlled;

In block S132, the electronic device compares the relative vehicle data with preset ranges to obtain a comparison result, and selects a point cloud data weighting corresponding to the point cloud data from preset weightings according to the comparison result;

In block S133, the electronic device calculates an initial data weighting corresponding to the initial vehicle data according to the point cloud data weighting and a preset value;

In block S134, the electronic device obtains target vehicle data by calculating the relative vehicle data and the initial vehicle data, according to the point cloud data weighting and the initial data weighting.

Figure 4:
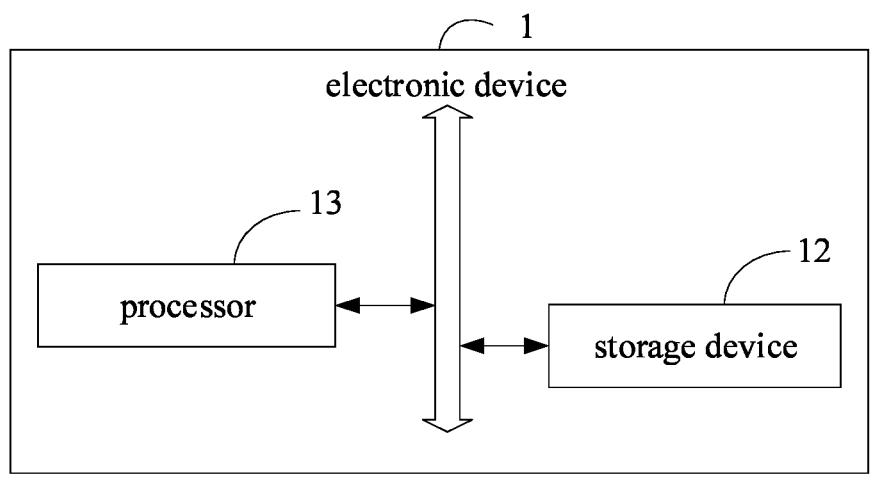
FIG. 4 shows a schematic diagram of an electronic device provided in an embodiment of the present disclosure.

FIG. 4 is a schematic structural diagram of an electronic device provided in an embodiment of the present disclosure. The method for controlling vehicles provided in an embodiment of the present disclosure is applied to an electronic device 1, which includes, but is not limited to, a storage device 12, and at least one processor 13. The storage device 12, and the at least one processor 13 are connected to each other through a communication bus. The camera 13 can be an on-board camera of a vehicle, a camera of an external vehicle, such as a camera or a tachograph, to capture images or videos in front of a vehicle.

In an embodiment of the present disclosure, the electronic device 1 can be applied to vehicles, for example, an on-board device in a vehicle (for example, a vehicle machine), or an independent on-board device (for example, a computer, a laptop, a mobile phone, etc.). The electronic device 1 can communicate and interact with the on-board device to achieve a control of the vehicle.

The storage device 12 stores computer-readable instructions, for example, recognizing pedestrian programs, and the computer-readable instructions can be executed on the at least one processor 13. The processor 13 executes the computer-readable instructions to implement the steps in the embodiment of the method for controlling vehicles, such as in steps in block S11-S14 shown in FIG. 1, or in steps in block S121-S125 shown in FIG. 2, or in steps in block S131-S134 shown in FIG. 3.

For example, the computer-readable instructions can be divided into one or more modules/units, and the one or more modules/units are stored in the storage device 12 and executed by the at least one processor 13. The one or more modules/units can be a series of computer-readable instruction segments capable of performing specific functions, and the instruction segments are used to describe execution processes of the computer-readable instructions in the electronic device 1.

The electronic device 1 can be an electronic device such as a desktop computer, a notebook, a palmtop computer, and a cloud server. Those skilled in the art will understand that the schematic diagram 1 is only an example of the electronic device 1 and does not constitute a limitation on the electronic device 1. Another electronic device 1 may include more or fewer components than shown in the figures or may combine some components or have different components. For example, the electronic device 1 may further include an input/output device, a network access device, a bus, and the like.

The at least one processor 13 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. . . . . The processor 13 can be a microprocessor or any conventional processor. The processor 13 is a control center of the electronic device 1 and connects various parts of the entire electronic device 1 by using various interfaces and lines.

The storage device 12 can be configured to store the computer-readable instructions and/or modules/units. The processor 13 may run or execute the computer-readable instructions and/or modules/units stored in the storage device 12 and may call up data stored in the storage device 12 to implement various functions of the electronic device 1. The storage device 12 mainly includes a storage program area and a storage data area. The storage program area may store an operating system, and an application program required for at least one function (such as a sound playback function, an image playback function, etc.), etc. . . . . The storage data area may store data (such as audio data, phone book data, etc.) created according to the use of the electronic device 1. In addition, the storage device 12 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

When the modules/units integrated into the electronic device 1 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

In the several embodiments provided in the preset application, the disclosed electronic device and method can be implemented in other ways. For example, the embodiments of the devices described above are merely illustrative. For example, divisions of the units are only logical function divisions, and there can be other manners of division in actual implementation.

In addition, each functional unit in each embodiment of the present disclosure can be integrated into one processing unit, or can be physically present separately in each unit or two or more units can be integrated into one unit. The above modules can be implemented in a form of hardware or in a form of a software functional unit.

Optionally, the method for controlling vehicles of the present disclosure can be applied to one or more electronic devices. Such electronic device includes hardware such as, but not limited to, a microprocessor and an Application Specific Integrated Circuit (ASIC), Field-Programmable Gate Array (FPGA), Digital Signal Processor (DSP), embedded devices, etc.

The electronic device may be a device such as a desktop computer, a notebook, a palmtop computer, or a cloud server. The electronic device can interact with users through a keyboard, a mouse, a remote control, a touch panel, or a voice control device.

The present disclosure is not limited to the details of the above-described exemplary embodiments, and the present disclosure can be embodied in other specific forms without departing from the spirit or essential characteristics of the present disclosure. Therefore, the embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be repaired, or some of the technical mapped features can be equivalently substituted, and that these modifications or substitutions are not to detract from the essence of the technical solutions or from the scope of the technical solutions of the embodiments of the present disclosure.

What is claimed is:

1. A method for controlling vehicles, the method comprising:
    acquiring a license plate image of a target vehicle in front of a vehicle to be controlled, and acquiring point cloud data of the target vehicle through a radar;
    identifying the license plate image and obtaining initial vehicle data of the target vehicle, the initial vehicle data comprising a first relative distance between the target vehicle and the vehicle to be controlled and a speed of the target vehicle, wherein identifying the license plate image and obtaining initial vehicle data of the target vehicle comprises: identifying the license plate image and determining a vehicle type of the target vehicle; acquiring a first size of the license plate of the target vehicle according to the vehicle type; processing the license plate image and obtaining a processed image; calculating the first relative distance according to a focal length of a photographing device that captures the license plate image, the first size of the license plate of the target vehicle and the processed image; calculating the speed of the target vehicle according to any two adjacent first relative distances and two shooting times of the license plate images corresponding to the any two adjacent first relative distances;
    calculating target vehicle data of the target vehicle based on preset ranges, vehicle data of the vehicle to be controlled, the point cloud data and the initial vehicle data, comprising: calculating relative vehicle data according to the point cloud data and the vehicle data of the vehicle to be controlled; comparing the relative vehicle data with the preset ranges, and obtaining a comparison result; selecting a point cloud data weighting corresponding to the point cloud data from preset weightings according to the comparison result; calculating an initial data weighting corresponding to the initial vehicle data according to the point cloud data weighting and a preset value; obtaining the target vehicle data by calculating the relative vehicle data and the initial vehicle data, according to the point cloud data weighting and the initial data weighting;
    in response that the target vehicle data meets preset conditions, adjusting the vehicle data of the vehicle to be controlled according to the target vehicle data, the target vehicle data comprises a target distance and a target speed, wherein in response that the target vehicle data meets preset conditions, adjusting the vehicle data of the vehicle to be controlled according to the target vehicle data comprises: comparing the target distance with a preset safe distance, and comparing the target speed with the speed of the vehicle to be controlled; in response that the target distance is less than the preset safe distance and/or the target speed is less than the speed of the vehicle to be controlled, adjusting the speed of the vehicle to be controlled and an acceleration of the vehicle to be controlled until the target distance is greater than or equal to the preset safe distance.

2. The method according to claim 1, wherein calculating the first relative distance according to a focal length of a photographing device that captures the license plate image, the first size of the license plate of the target vehicle and the processed image comprises:
    calculating a second size of the license plate of the processed image;
    calculating a first product of the focal length and the first size;
    determining a ratio of the first product to the second size as the first relative distance.

3. The method according to claim 1, wherein the relative vehicle data comprises a speed of the vehicle to be controlled and a second relative distance, wherein calculating relative vehicle data according to the point cloud data and the vehicle data of the vehicle to be controlled comprises:
    acquiring a first position of the target vehicle from the point cloud data;
    acquiring a second position of the vehicle to be controlled from the vehicle data of the vehicle to be controlled;
    calculating the second relative distance according to the first position and the second position;

calculating the speed of the vehicle to be controlled according to any two adjacent second relative distances and two radar scanning times corresponding to the any two adjacent second relative distances.

4. The method according to claim 3, wherein the preset ranges comprises a preset distance range and a preset speed range, wherein selecting a point cloud data weighting corresponding to the point cloud data from preset weightings according to the comparison result comprises:
in response that the comparison result indicates that the second relative distance is within the preset distance range and the speed of the vehicle to be controlled is within the preset speed range, determining that the point cloud data weighting being a preset first weighting;
in response that the comparison result indicates that the second relative distance is within the preset distance range and the speed of the vehicle to be controlled is not within the preset speed range, determining that the point cloud data weighting being a preset second weighting;
in response that the comparison result indicates that the second relative distance is not within the preset distance range and the speed of the vehicle to be controlled is within the preset speed range, determining that the point cloud data weighting being a preset third weighting;
in response that the comparison result indicates that the second relative distance is not within the preset distance range and the speed of the vehicle to be controlled is not within the preset speed range, determining the point cloud data weighting being a preset fourth weighting.

5. The method according to claim 1, wherein obtaining the target vehicle data by calculating the relative vehicle data and the initial vehicle data, according to the point cloud data weighting and the initial data weighting comprises:
obtaining a plurality of second products by calculating a product of the point cloud data weighting and each data in the relative vehicle data;
obtaining a plurality of third products by calculating a product of the initial data weighting and each data in the initial vehicle data;
calculating a sum of each second product and the corresponding third product to obtain the target vehicle data.

6. An electronic device, comprising:
a storage device and at least one processor, the storage device stores at least one computer-readable instruction, which when executed by the processor causes the at least one processor to:
acquire a license plate image of a target vehicle in front of a vehicle to be controlled, and acquire point cloud data of the target vehicle through a radar;
identify the license plate image and obtain initial vehicle data of the target vehicle, the initial vehicle data comprising a first relative distance between the target vehicle and the vehicle to be controlled and a speed of the target vehicle, wherein the at least one processor identifies the license plate image and obtaining initial vehicle data of the target vehicle by: identifying the license plate image and determining a vehicle type of the target vehicle; acquiring a first size of the license plate of the target vehicle according to the vehicle type; processing the license plate image and obtaining a processed image; calculating the first relative distance according to a focal length of a photographing device that captures the license plate image, the first size of the license plate of the target vehicle and the processed image; calculating the speed of the target vehicle according to any two adjacent first relative distances and two shooting times of the license plate images corresponding to the any two adjacent first relative distances;
calculate target vehicle data of the target vehicle based on preset ranges, vehicle data of the vehicle to be controlled, the point cloud data and the initial vehicle data, comprising: calculate relative vehicle data according to the point cloud data and the vehicle data of the vehicle to be controlled; comparing the relative vehicle data with the preset ranges, and obtain a comparison result; select a point cloud data weighting corresponding to the point cloud data from preset weightings according to the comparison result; calculate an initial data weighting corresponding to the initial vehicle data according to the point cloud data weighting and a preset value; obtain the target vehicle data by calculating the relative vehicle data and the initial vehicle data, according to the point cloud data weighting and the initial data weighting;
in response that the target vehicle data meets preset conditions, adjust the vehicle data of the vehicle to be controlled according to the target vehicle data, the target vehicle data comprises a target distance and a target speed, wherein in response that the target vehicle data meets preset conditions, adjust the vehicle data of the vehicle to be controlled according to the target vehicle data comprises: compare the target distance with a preset safe distance, and compare the target speed with the speed of the vehicle to be controlled; in response that the target distance is less than the preset safe distance and/or the target speed is less than the speed of the vehicle to be controlled, adjust the speed of the vehicle to be controlled and an acceleration of the vehicle to be controlled until the target distance is greater than or equal to the preset safe distance.

7. The electronic device according to claim 6, wherein the at least one processor calculates the first relative distance according to a focal length of a photographing device that captures the license plate image, the first size of the license plate of the target vehicle and the processed image by:
calculating a second size of the license plate of the processed image;
calculating a first product of the focal length and the first size;
determining a ratio of the first product to the second size as the first relative distance.

8. The electronic device according to claim 6, wherein the relative vehicle data comprises a speed of the vehicle to be controlled and a second relative distance, wherein the at least one processor calculates relative vehicle data according to the point cloud data and the vehicle data of the vehicle to be controlled by:
acquiring a first position of the target vehicle from the point cloud data;
acquiring a second position of the vehicle to be controlled from the vehicle data of the vehicle to be controlled;
calculating the second relative distance according to the first position and the second position;
calculating the speed of the vehicle to be controlled according to any two adjacent second relative distances and two radar scanning times corresponding to the any two adjacent second relative distances.

9. The electronic device according to claim 8, wherein the preset ranges comprises a preset distance range and a preset speed range, wherein the at least one processor selects a point cloud data weighting corresponding to the point cloud data from preset weightings according to the comparison result by:

in response that the comparison result indicates that the second relative distance is within the preset distance range and the speed of the vehicle to be controlled is within the preset speed range, determining that the point cloud data weighting being a preset first weighting;

in response that the comparison result indicates that the second relative distance is within the preset distance range and the speed of the vehicle to be controlled is not within the preset speed range, determining that the point cloud data weighting being a preset second weighting;

in response that the comparison result indicates that the second relative distance is not within the preset distance range and the speed of the vehicle to be controlled is within the preset speed range, determining that the point cloud data weighting being a preset third weighting;

in response that the comparison result indicates that the second relative distance is not within the preset distance range and the speed of the vehicle to be controlled is not within the preset speed range, determining the point cloud data weighting being a preset fourth weighting.

10. The electronic device according to claim 6, wherein the at least one processor obtains the target vehicle data by calculating the relative vehicle data and the initial vehicle data, according to the point cloud data weighting and the initial data weighting by:

obtaining a plurality of second products by calculating a product of the point cloud data weighting and each data in the relative vehicle data;

obtaining a plurality of third products by calculating a product of the initial data weighting and each data in the initial vehicle data;

calculating a sum of each second product and the corresponding third product to obtain the target vehicle data.

11. A non-transitory storage medium having stored thereon at least one computer-readable instructions that, when the at least one computer-readable instructions are executed by a processor of an electronic device to implement a method for controlling vehicles, the method comprising:

acquiring a license plate image of a target vehicle in front of a vehicle to be controlled, and acquiring point cloud data of the target vehicle through a radar;

identifying the license plate image and obtaining initial vehicle data of the target vehicle, the initial vehicle data comprising a first relative distance between the target vehicle and the vehicle to be controlled and a speed of the target vehicle, wherein identifying the license plate image and obtaining initial vehicle data of the target vehicle comprises: identifying the license plate image and determining a vehicle type of the target vehicle; acquiring a first size of the license plate of the target vehicle according to the vehicle type; processing the license plate image and obtaining a processed image; calculating the first relative distance according to a focal length of a photographing device that captures the license plate image, the first size of the license plate of the target vehicle and the processed image; calculating the speed of the target vehicle according to any two adjacent first relative distances and two shooting times of the license plate images corresponding to the any two adjacent first relative distances;

calculating target vehicle data of the target vehicle based on preset ranges, vehicle data of the vehicle to be controlled, the point cloud data and the initial vehicle data, comprising: calculating relative vehicle data according to the point cloud data and the vehicle data of the vehicle to be controlled; comparing the relative vehicle data with the preset ranges, and obtaining a comparison result; selecting a point cloud data weighting corresponding to the point cloud data from preset weightings according to the comparison result; calculating an initial data weighting corresponding to the initial vehicle data according to the point cloud data weighting and a preset value; obtaining the target vehicle data by calculating the relative vehicle data and the initial vehicle data, according to the point cloud data weighting and the initial data weighting;

in response that the target vehicle data meets preset conditions, adjusting the vehicle data of the vehicle to be controlled according to the target vehicle data, the target vehicle data comprises a target distance and a target speed, wherein in response that the target vehicle data meets preset conditions, adjusting the vehicle data of the vehicle to be controlled according to the target vehicle data comprises: comparing the target distance with a preset safe distance, and comparing the target speed with the speed of the vehicle to be controlled; in response that the target distance is less than the preset safe distance and/or the target speed is less than the speed of the vehicle to be controlled, adjusting the speed of the vehicle to be controlled and an acceleration of the vehicle to be controlled until the target distance is greater than or equal to the preset safe distance.

12. The non-transitory storage medium according to claim 11, wherein calculating the first relative distance according to a focal length of a photographing device that captures the license plate image, the first size of the license plate of the target vehicle and the processed image comprises:

calculating a second size of the license plate of the processed image;

calculating a first product of the focal length and the first size;

determining a ratio of the first product to the second size as the first relative distance.

* * * * *